A. W. GIAMPIETRO.
FLEXIBLE KNIFE FOR THE EXTRACTION OF ESSENTIAL OILS AND REMOVAL OF PEELING FROM ANY SPHERICAL FRUIT.
APPLICATION FILED MAR. 5, 1913. RENEWED MAY 9, 1914.
1,116,881.
Patented Nov. 10, 1914.
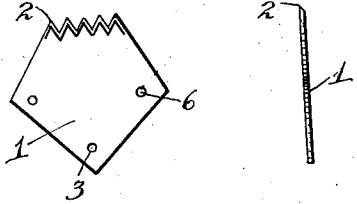
Fig. 1.  Fig. 1ª.
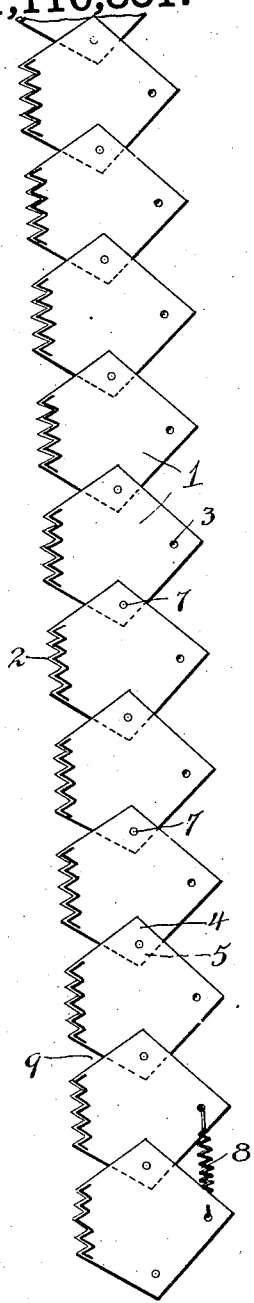
Fig. 2.
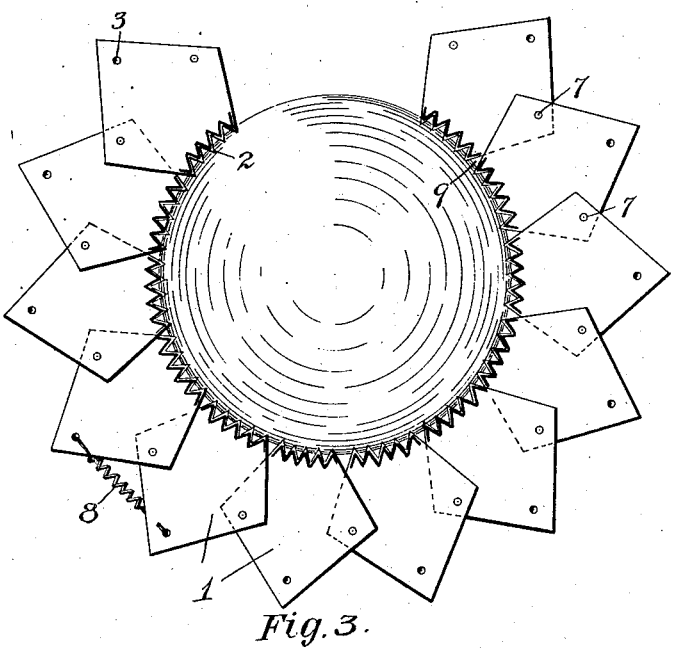
Fig. 3.
Witnesses.
Inventor.

UNITED STATES PATENT OFFICE.

ARISTIDE W. GIAMPIETRO, OF TAMPA, FLORIDA.

FLEXIBLE KNIFE FOR THE EXTRACTION OF ESSENTIAL OILS AND REMOVAL OF PEELING FROM ANY SPHERICAL FRUIT.

1,116,881.   Specification of Letters Patent.   Patented Nov. 10, 1914.

Application filed March 5, 1913, Serial No. 752,175. Renewed May 9, 1914. Serial No. 837,580.

*To all whom it may concern:*

Be it known that I, ARISTIDE W. GIAMPIETRO, a citizen of the United States, and resident of Tampa, in the county of Hillsborough and State of Florida, have invented a new and useful Improvement in Flexible Knives for the Extraction of Essential Oils and Removal of Peelings from any Spherical Fruit, of which the following is a specification.

My invention relates to the improvement in extracting the essential oils and removing the peeling from fruits by using a knife made of several jointed sections, which can be flexed and adapted to any shape of fruit, and attached to the machines used now for said purpose.

Referring to the accompanying drawing, Figure 1 is a view in elevation of the face of one of the knife sections; Fig. 1ª is a similar view of one edge thereof; Fig. 2 is a view in elevation of several connected sections of the knife; and Fig. 3 is an elevation of the complete knife, encircling a spherical fruit as an orange.

In the drawing, reference numeral 1 designates the knife sections, which are substantially rectangular, and have serrated cutting edges 2. The corners opposite the cutting edges are provided with openings 3 and the other corners 4 and 5 are apertured as at 6 to receive pivots 7 whereby overlapping corners 4 and 5 of the adjacent sections 1 are pivoted together to make up a flexible knife. The sections are further connected together by spring coils 8 having their ends hooked in the said apertures 3.

In operation, the knife is placed about the fruit with the cutting edges engaged with the periphery thereof and, as the sections 1 turn on their pivots, the cutting edge of one section moves adjacent that of the others to decrease the gaps 9 between the sections 1 and to cause the cutting edges to form an alinement co-incident with the contour of the fruit. In assuming this shape, the outer corners to which the coil springs 8 are connected move away from each other, placing the springs under tension, and upon completion of the cutting operation, these springs return the sections to their normal relation in which their cutting edges form a right line.

In operation, the fruit may, and preferably is, rotated within the inclosing knife, by hand or mechanical means, though instead the fruit may remain stationary and the knife bodily rotated wholly or partially about the fruit. The movement of the knife or fruit, however, is relative, and the means for producing the movement is immaterial.

It is evident, therefore, that the knife being springy, can be adapted to most any size or shape of fruit and by the pressure and movement of the knife over the surface of the fruit, the teeth of the knife will cut the cells containing the essential oils and located principally in the yellow coat of the rind, and set free the oil they contain, and later remove the peeling entirely if so desired.

What I claim is:

1. A flexible knife comprising jointed sections having cutting edges, and means tending to normally force the cutting edges of the sections into alinement with each other.

2. A flexible knife, comprising jointed sections having cutting edges on one side of the joints, and coil springs connecting the portions on opposite sides of the joints and normally drawing said portions of adjacent sections together.

3. A flexible member adapted to be wrapped about an object, and means for straightening out the flexible member when released from about the object, said flexible member having a cutting edge for acting upon the object.

ARISTIDE W. GIAMPIETRO.

Witnesses:
 ELEONORA GIAMPIETRO,
 FRANK BOSCO.